United States Patent [19]

van der Togt

[11] 4,299,550
[45] Nov. 10, 1981

[54] DEVICE FOR MAKING BATCHES OF DOUGH READY FOR THE OVEN

[75] Inventor: Jacobus C. van der Togt, Voorburg, Netherlands

[73] Assignee: Haagse Bakkerijmachinefabriek Arnold Kalmeijer B.V., The Hague, Netherlands

[21] Appl. No.: 858,079

[22] Filed: Dec. 6, 1977

[30] Foreign Application Priority Data

Dec. 16, 1976 [NL] Netherlands ............... 7613994

[51] Int. Cl.³ .............................. A21C 3/02
[52] U.S. Cl. .................... 425/321; 425/364 R; 425/372
[58] Field of Search ......... 425/329, 328, 335, 371, 425/372, 391, 394, 397, 168, 364 R, 334, 337

[56] References Cited

U.S. PATENT DOCUMENTS

| 1,109,895 | 9/1914 | Baker et al. ............... 425/168 |
| 2,017,605 | 10/1935 | Peters ....................... 425/335 X |
| 2,246,477 | 6/1941 | Attaway et al. ............ 425/328 |
| 2,261,043 | 10/1941 | Winfree, Jr. ............... 425/328 |
| 2,704,982 | 3/1955 | Rhodes ...................... 425/372 |

FOREIGN PATENT DOCUMENTS

| 294635 | 12/1914 | Fed. Rep. of Germany ...... 425/335 |
| 1298467 | 7/1969 | Fed. Rep. of Germany ...... 425/373 |
| 522361 | 6/1972 | Switzerland ........................ 425/371 |

*Primary Examiner*—William R. Briggs
*Attorney, Agent, or Firm*—John P. Snyder

[57] ABSTRACT

A device for making batches of bread paste ready for the oven comprising a member deforming each risen batch of paste into elongated slabs, a folding mechanism receiving slabs from said member for folding the front and rear portions on the central portion and a conveying section for conducting away the folded piece of paste transversely of the direction of folding, the improvement is that the folding mechanism comprises two normally adjacent carriers adapted to reciprocate along a common path, the movement of the hindmost lagging with respect to that of the foremost carrier so that through the space formed between the carriers, first the central portion drops onto the subjacent conveying section, after which the front and end portions are folded onto the central portion.

17 Claims, 4 Drawing Figures

U.S. Patent
Nov. 10, 1981
4,299,550
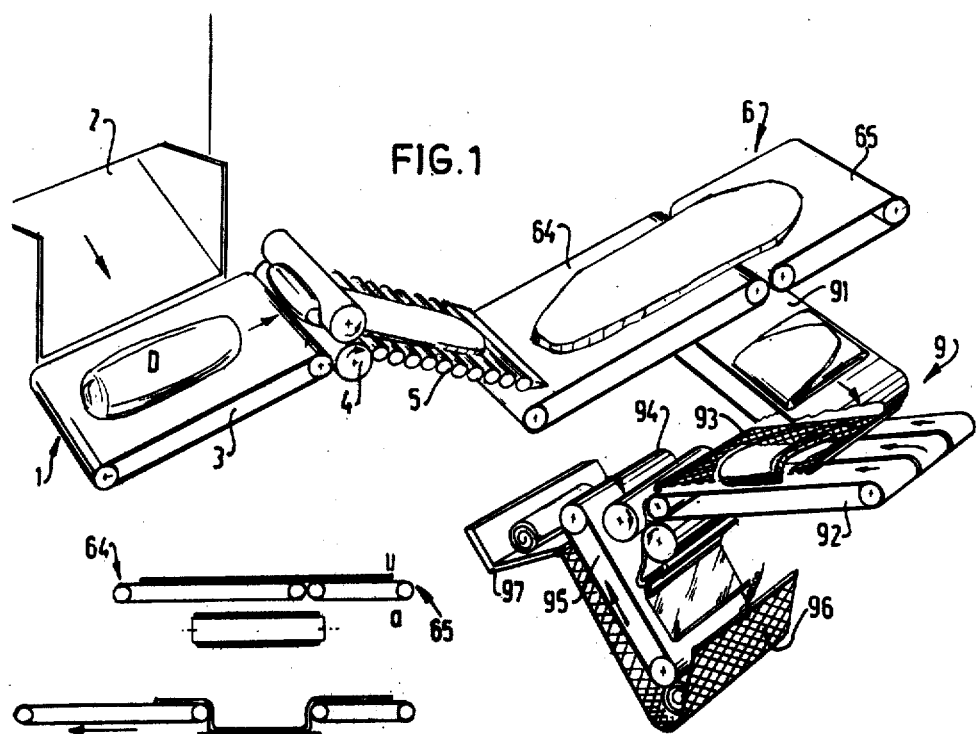
FIG.1
FIG.2
FIG.4
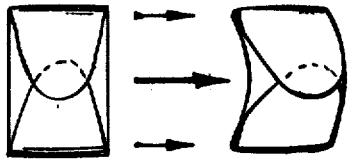
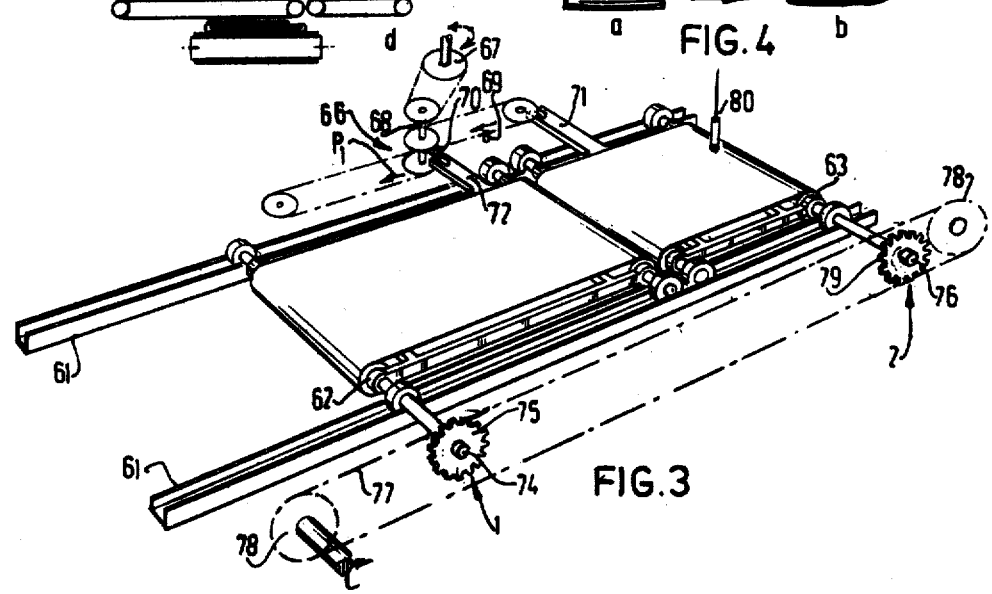
FIG.3

//  4,299,550

DEVICE FOR MAKING BATCHES OF DOUGH READY FOR THE OVEN

The invention relates to a device for making batches of bread paste ready for the oven comprising a member rolling each risen batch of paste into elongated slabs, a folding mechanism receiving the slabs from said member for folding the front and rear portions on the central portion and a conveying section for conducting away the folded piece of paste transversely of the direction of folding.

Devices of the kind set forth are known for working batches of dough suitable for flaky paste. The slabs of paste are frequently folded over, but these known devices are not suitable for making bread paste.

There is furthermore known a device in which the slab of dough intended for making bread is, in fact, folded over, however without being worked further so that the folded slab is not ready for the oven.

The invention has for its object to improve and extend such a device so that the risen slab of paste is worked fully automatically without manual intervention into an oven-ready slab of paste of high-grade bread.

To this end the invention provides a device distinguished in that the folding mechanism comprises two normally adjacent carriers adapted to reciprocate along a common path, the movement of the hindmost lagging with respect to that of the foremost carrier so that through the space formed between the carriers first the central portion drops onto the subjacent conveying section, after which the front and end portions are folded onto the central portion.

In this stage of the treatment the bulk of paste is unevenly distributed. Due to the non-accurately rectangular shape of the roiled slab of paste, the end portions of which have a rounded edge, a larger mass of paste is passed to the centre. During the subsequent treatment consisting of renewed rolling out in the transverse direction and of subsequent coiling of the resultant slab of paste the slab of paste will assume a very irregular shape, which results in the ready slab of paste in a particularly irregular shape of the "end" of the paste slab. This becomes manifest afterwards in the baked product.

In order to obtain a straight end of the ready paste slab the invention proposes to equip the conveying section after the folding mechanism with deformation means for reshaping a slab of paste, having a straight side edge.

In a preferred embodiment said deformation means comprise a pair of pressure rollers and a conveyor leading to the same and having at least three endless, parallel belts, the central belt or belts travelling at a higher speed than the outermost belts.

This construction has the advantage that owing to the higher speed of the central belts the excess paste in the centre of the slab can be displaced laterally before the slab of paste reaches the pair of pressure rollers. During rolling the resultant slab of paste then has a straight side edge providing a straight end when the slab is coiled up.

The invention will be described more fully with reference to an embodiment shown schematically in the accompanying drawing.

In the drawing

FIG. 1 is a perspective view of the main elements of the device,

FIG. 2 is a diagram of the sequence of movements of the folding mechanism,

FIG. 3 is a perspective view of the folding mechanism with the associated drive, FIG. 4 shows the slab of paste prior to and after the deformation in the conveying section.

Referring to FIG. 1 the device mainly comprises a pick-up part 1 having a conveying element 3 joining a feeding gutter 2. After said conveyor is arranged a pair of pressure rollers 4 rolling out the slab of paste D fed by the conveyor 3 into an elongated slab shown on the roller path 5 behind the pressure rollers 4.

This slab is transferred to a folding mechanism 6 comprising, in accordance with the invention, two carriers 62 and 63 adapted to reciprocate along a common path and not shown in FIG. 1 for the sake of clarity, but shown in FIG. 3 in the form of a carriage 62 and 63 respectively adapted to run along the path formed by profiles 61. Each carriage has an endless belt element 64 and 65 respectively, each of which is passed around two rollers carried by the associated carriage.

FIG. 3 shows schematically the drive 66 of the carriages 62 and 63. It comprises an intermediate shaft 68 with three chain sprockets to be rotated in a reciprocatory manner by a driving shaft 67. The topmost sprocket co-operates with a chain sprocket of the driving shaft 67, whereas the two lower sprockets co-operate each with a chain having a lug-shaped extension 69 and 70 respectively. The lugs snap into a recess of a stop 71 and 72 respectively secured to each carriage. By means of this simple, but effective drive the reciprocatory movements of the carriages 62 and 63 can be caused to lag one behind the other, which will be explained more fully hereinafter.

On the sides of the carriages 62 and 63 remote from the driving gear 67 a mechanism is provided for driving the belts 64 and 65. For this purpose a spindle of a reversing roller of the belt is laterally prolonged as far as beyond the supporting wheel of the carriage. These spindle portions 74 and 76 are provided with chain sprockets 75 and 79, co-operating with an endless chain 77 passing around reversing wheels 78, one of which is driven. These wheels are mounted so that the sprocket 75 of the carrier 64 co-operates with the upper run of the endless chain 77 and the sprocket 79 of the carrier 63 with the lower run of the endless chain 77. When the endless chain 77 is driven through one of the wheels 78, the shafts 74 and 76 are caused to move by means of the wheels 75 and 79 and hence also the endless belts 64 and 65.

Folding up a rolled slab of paste as shown in FIG. 1 is illustrated in detail in FIG. 2. Starting from the normal position of the belt elements 64 and 65 (see FIG. 2a), first the belt 64 is moved to the left, the wheels of the carriage 62 being guided on the rails 61. This left-hand movement is performed by driving the lug 70 in the direction of the arrow P1, the stop 72 being caught along. The central portion of the slab of paste drops onto a surface located beneath the endless belt members, which is illustrated in FIG. 2b.

In the meantime the lug 69 has returned around the wheel 68 to the other reversing wheel and gets into engagement with the recess of the stop 71 so that upon a further movement of the lug 69 the carriage 63 is caught along to the left (see FIG. 2c). Meanwhile the lug 70 is released from the stop 72 and the carriage 62 stands still.

Then the direction of rotation of the driving shaft 67 is reversed so that the carriage 63 is first moved to the right (see the broken arrow in FIG. 2c) until the lug 69 releases the stop 71 and the lug 70 again snaps into the recess of the stop 72, the carriage 62 being returned (see FIG. 2d).

During this reciprocatory movement the belt members 64 and 65 are controlled so that with respect to the carriages 62 and 63 a similar, synchronized reciprocatory movement is also imparted to them by the driving system with the chain 77.

When a slab of paste is fed onto the belts, the driving shaft of the chain sprocket 78 is driven with such a speed that the slab is transferred in a non-deformed state on the belt members 64 and 65. As soon as the front end of the slab approaches a monitoring member 80, the drive of the chain 77 is halted. Subsequently the driving shaft 67 is actuated in the manner described above. When the carriage 62 moves to the left, the wheel 75 rolls along the upper run of the chain 77 so that by choosing a suitable transmission ratio it can be ensured that the upper surface of the belt 64 apparently stands still. Therefore, the paste slab will drop onto the subjacent supporting surface without deformation. However, upon a left-hand movement of the carriage 63 the wheel 79 changes its direction of rotating owing to the co-operation with the opposite run of the chain 77, so that the belt 65 lags with respect to the sense of movement of the carriage 63. As a result the foremost end portion of the paste slab is folded over to the position shown in FIG. 2c.

When the carriage 63 is returned, the carriage 62 will move to the right some time later, upon which the chain 77 is started. The speed of rotation of the driving shaft 78 is chosen with respect to that of the driving shaft 67 so that the belt 64 also lags with respect to the movement of the carriage 62. Owing to this lag the hindmost portion of the slab is folded over onto the previously folded portion (see FIG. 2d) When the drive 67 is halted, the two belts are immediately ready for receiving a next slab of paste, since the drive of 78 is maintained. Consequently, the folding cycle can immediately start again.

Again referring to FIG. 1, a conveying section 9 is arranged beneath the folding mechanism 6 in a direction transverse of the direction of folding. The receiving surface located beneath the belt members 64 and 65 is formed in the embodiment shown by a rotatable conveyor belt delivering the folded slab of paste to deformation means included in said section. These deformation means comprise a conveyor 92 located beneath the conveyor belt 91, the beginning being located beneath the end of the belt 91. At this place it is ensured that the slab of paste emanating from the belt 91 arrives after a turn through 130° at the active surface of the conveyor 92. At a given distance above the active surface of the conveyor 92 is arranged a wall 93, which is fixed in place with respect to the conveying direction but which yields in a direction perpendicular thereto. At the end of the conveyor 92 a second pair of pressure rollers 94 is provided to again deform the batch of paste in a transverse direction into a slab of paste. Below the pressure rollers 94 the slab of paste is again coiled by an apparatus formed by an upwardly inclined conveyor 95, the upper run of which travels downwards and the lower run is located at a distance from a fixed, but resilient wall 96. Coiling starts at a bent-over edge of a fixed plate arranged at a distance above the upper run of the belt 95. By the rotation of the belt 95 the slab is automatically coiled and delivered to a delivery gutter 97. It will be obvious that in order to obtain a satisfactorily coiled paste product the rear edge, which is virtually the side edge of the folded batch of paste has to be straight in order to ensure that the end of the coiled piece only extends in the axial sense.

In order to obtain a straight end the conveyor 92 is equipped with three conveyor belts, the central one travelling at a higher rate than the two outermost belts. When the slab of paste is turned from the belt 91, the two folded-over portions of the slab get on the conveyor 92, the slab being thus deformed as shown in FIG. 4. While initially the end portions are in direct superposition as shown in FIG. 4a after having passed the conveyor 92, these end portions are shifted in place as shown in FIG. 4b. The displacement occurs in the direction of the pressure rollers 94 so that the largest quantity of paste is first engaged by the rollers 94. During rolling the straight side of the slab of paste is maintained.

As a matter of course, other embodiments can be designed within the scope of the present invention.

What is claimed is:

1. In a device for readying dough for baking having rolling means for rolling risen dough into a slab, folding means for folding said slab of dough and which comprises, in combination:

first and second conveyor sections normally disposed in end-to-end relation;

a further conveyor disposed below the adjacent ends of said conveyor sections;

first drive means for driving said conveyor sections until a slab of dough is partially supported by each section; and second drive means for reciprocating said conveyor sections in staggered relation whereby to deposit a central portion of the slab onto said further conveyor and thereafter fold the opposite ends of said slab onto such central portion;

said first drive means including mechanism operative, in the absence of drive input to such first drive means, to feed end portions of the dough slab off of the respective conveyor sections in response to movement thereof by said second drive means but at a rate slower than the movement imparted to the sections by said second drive means.

2. In a device for readying bread dough for baking, a folding mechanism comprising in combination:

first support means for receiving a slab of dough and comprising first and second dough feed means normally disposed in non-driven end-to-end relation cooperatively to define a fixed, horizontal support surface for a dough slab with each feed means supporting a portion of the length of the dough slab;

second support means disposed below said first support means for cooperating therewith to effect folding of said dough slab; and drive means for relatively separating said first and second dough feed means while feeding the dough off either feed means moving with respect to said second support means and onto said second support means whereby to deposit a central portion of the dough slab onto said second support means and for subsequently returning said first and second dough feed means sequentially to said normally disposed end-to-end relation while feeding the dough off of such feed means whereby to fold the opposite end portions of the slab over onto said central portion.

3. In a device as defined in claim 2 wherein each dough feed means is in the form of a carrier and an endless belt on said carrier the upper flight of which forms a dough slab-supporting surface.

4. In a device as defined in claim 3 wherein said drive means includes mechanism for sequentially moving said feed means in one direction and then sequentially returning them in the opposite direction.

5. In a device as defined in claim 4 wherein said drive means also includes an endless member, a driving element on one carrier engaging one flight of said endless member and a driving element on the other carrier engaging the other flight of said endless member.

6. In a device as defined in claim 4 wherein said mechanism comprises a pair of endless drive members and a lug on each of said endless drive members, one of said carriers being intermittently engaged by one lug and the other carrier being intermittently engaged by the other lug.

7. In a device as defined in claim 2 wherein said second support means is in the form of a conveyor.

8. In a device as defined in claim 7 including deformation means receiving a folded slab from said conveyor for flattening and deforming the folded slab.

9. A device as claimed in claim 8 characterized in that the deformation means are formed by a pair of pressure rollers and by a conveyor discharging towards the pressure rollers and having at least three endless, parallel belts, and drive means for driving the central belt or belts at a higher speed than the outermost belts.

10. In a device as defined in claim 9 wherein the conveyor forming said second support means transfers a folded slab laterally with respect to the direction of reciprocation of said feeding means and deposits each folded slab onto one end of said conveyor of the deformation means.

11. A device as claimed in claim 9 characterized in that at a distance above the parallel shaping belts a wall is arranged, which is fixed in place in the conveying direction but which is flexible in a direction perpendicular thereto.

12. A device for readying dough for baking, which comprises in combination:
 first rolling means for forming risen dough into a slab;
 first support means for receiving a slab of dough from said first rolling means, said first support means comprising first and second conveyor sections disposed normally in end-to-end relation and including first drive means for driving said conveyor sections to feed a slab of dough thereonto until said slab is partially supported on each section;
 a transfer conveyor disposed below said conveyor sections;
 means for supporting said sections for reciprocation in a common plane; and
 second drive means for reciprocating said sections in staggered relation such that a central portion of the slab is first deposited on said transfer conveyor and the opposite ends of the slab are thereafter sequentially folded over onto said central portion, said first drive means being effective, in the absence of drive input thereto, to cause said conveyor sections to feed dough therefrom in response to movement thereof by said second drive means.

13. A device as defined in claim 12 including deformation means for receiving a folded dough slab from said transfer conveyor and forming it into a roll ready for baking.

14. In a device for readying dough for baking, the combination of:
 first and second conveyor means normally disposed in end-to-end relation to define an essentially uninterrupted support surface;
 feed means for feeding a dough slab onto one of said first and second conveyor means while they are disposed in said end-to-end relation;
 first drive means for driving said first and second conveyor means while said feed means is feeding the dough slab and until such slab has attained a predetermined position on said support surface in which it is partially supported by each of said first and second conveyor means;
 a further conveyor disposed below the adjacent ends of said first and second conveyor means; and
 second drive means for reciprocating said first and second conveyor means in staggered relation whereby to deposit a central portion of the dough slab onto said further conveyor and thereafter to fold the opposite ends of the dough slab onto such central portion and into overlapping relation with each other;
 said first drive means including mechanism operative, in the absence of drive input to such first drive means, to feed end portions of the dough slab off of the respective first and second conveyor means in response to the respective movements thereof by said second drive means.

15. In a device as defined in claim 14 including deformation means for flattening the folded dough slab into a further slab, and means for rolling said further slab into a coiled roll, said further conveyor including drive means for transporting a folded slab thereon to said deformation means.

16. In a device as defined in claim 15 wherein said deformation means comprises a conveyor having three separate side-by-side endless belts, drive means for advancing the center belt at a speed greater than the other belts, and a yieldable wall overlying but spaced from said belts.

17. In a device as defined in claim 16 wherein said further conveyor feeds the folded dough slab in a direction parallel to the folded sides thereof to said deformation means whereby the forward end edge of the folded slab is caused to become convex as the slab is flattened by said wall and conveyed by said belts, thus to leave said folded sides essentially straight, and including rolling means for receiving said convex end of the deformed slab and rolling it into a coiled roll in which said essentially straight folded sides are at the opposite ends of such coiled roll.

* * * * *